(12) United States Patent
Ouyang et al.

(10) Patent No.: US 12,724,279 B2
(45) Date of Patent: Sep. 1, 2026

(54) SMART GLASSES

(71) Applicant: Shenzhen Yiwen Tech Limited, Shenzhen (CN)

(72) Inventors: Jian Ouyang, Shenzhen (CN); Zheng Chang, Shenzhen (CN)

( * ) Notice: Subject to any disclaimer, the term of this patent is extended or adjusted under 35 U.S.C. 154(b) by 0 days.

(21) Appl. No.: 19/638,143

(22) Filed: Apr. 3, 2026

(65) Prior Publication Data

US 2026/0235882 A1 Aug. 13, 2026

Related U.S. Application Data

(63) Continuation of application No. PCT/CN2023/138550, filed on Dec. 13, 2023.

(30) Foreign Application Priority Data

Oct. 7, 2023 (WO) ................ PCT/CN2023/123277
Dec. 13, 2023 (WO) ................ PCT/CN2023/138550

(51) Int. Cl.
*G02B 27/01* (2006.01)
*F21V 8/00* (2006.01)
*G02B 1/11* (2015.01)

(52) U.S. Cl.
CPC ............ *G02B 27/0172* (2013.01); *G02B 1/11* (2013.01); *G02B 6/0026* (2013.01); *G02B 6/005* (2013.01);
(Continued)

(58) Field of Classification Search
CPC .. G02B 6/005; G02B 2027/0178; G02B 1/11; G02B 6/0093
See application file for complete search history.

(56) References Cited

U.S. PATENT DOCUMENTS

2012/0211323 A1 8/2012 Goeppert
2015/0268467 A1 9/2015 Cakmakci et al.
(Continued)

FOREIGN PATENT DOCUMENTS

CN 106842397 A 6/2017
CN 212083824 U 12/2020
(Continued)

OTHER PUBLICATIONS

The International Searching Authority written comments of PCT/CN2023/123277, Jun. 18, 2024, CN.
(Continued)

*Primary Examiner* — Alexander P Gross

(57) ABSTRACT

An optical waveguide plate (100), a frame, and smart glasses, which relate to the technical field of smart glasses. The optical waveguide plate (100) includes a waveguide substrate (10), a coupling-in region (20), and a coupling-out region (30); where the coupling-in region (20) and the coupling-out region (30) are disposed on the waveguide substrate (10), the coupling-in region (20) is configured to couple light into the waveguide substrate (10), and the coupling-out region (30) is configured to couple out the light propagating within the waveguide substrate (10); and a bottom edge of the coupling-out region (30) is located above a horizontal bisector of the optical waveguide plate (100), or the bottom edge of the coupling-out region (30) is entirely or partially flush with the horizontal bisector of the optical waveguide plate (100). The problem that smart glasses are unsuitable for extended use by a user due to the occurrence of rainbow patterns on the smart glasses is solved.

18 Claims, 7 Drawing Sheets

(52) U.S. Cl.
CPC .... *G02B 6/0093* (2013.01); *G02B 2027/0116* (2013.01); *G02B 2027/013* (2013.01); *G02B 2027/0178* (2013.01)

(56) References Cited

U.S. PATENT DOCUMENTS

| | | | |
|---|---|---|---|
| 2019/0129182 | A1 | 5/2019 | Hu et al. |
| 2022/0308343 | A1 | 9/2022 | Yang et al. |

FOREIGN PATENT DOCUMENTS

| | | | | | |
|---|---|---|---|---|---|
| CN | 212872969 | U | * | 4/2021 | |
| CN | 113366261 | A | | 9/2021 | |
| CN | 114265138 | A | | 4/2022 | |
| CN | 114967148 | A | | 8/2022 | |
| CN | 115202044 | A | | 10/2022 | |
| CN | 115236854 | A | | 10/2022 | |
| CN | 217587658 | U | | 10/2022 | |
| CN | 115586645 | A | | 1/2023 | |
| CN | 218938659 | U | | 4/2023 | |
| CN | 116661157 | A | | 8/2023 | |
| WO | 2021098744 | A1 | | 5/2021 | |
| WO | WO-2022222928 | A1 | * | 10/2022 | ............... G02B 6/00 |

OTHER PUBLICATIONS

The International Searching Report of PCT/CN2023/123277, Jun. 18, 2024, CN.

The International Searching Authority written comments of PCT/CN2023/138550, Jul. 8, 2024, CN.

The International Searching Report of PCT/CN2023/138550, Jul. 8, 2024, CN.

Utility Model Patent Evaluation Report of ZL2023234096100, Apr. 22, 2025, CN.

* cited by examiner

30

30

100

SMART GLASSES

TECHNICAL FIELD

The present application relates to the technical field of smart glasses, and in particular to an optical waveguide plate, a frame, and smart glasses.

BACKGROUND ART

Smart glasses typically achieve a display function through an optical waveguide solution, in which grating regions (a coupling-in region and a coupling-out region) of an optical waveguide mainly function to transmit light from an optical engine and increase the area of an eyebox (pupil expansion). However, natural light from the real environment transmitting through the coupling-out region may diffract, so that when a user uses smart glasses to see the real world, some diffractive rainbow stripes that do not exist in reality will appear, resulting in a poor user experience.

SUMMARY

The present application provides an optical waveguide plate, a frame, and smart glasses, which can solve the problem that smart glasses are unsuitable for long-term wearing by a user due to the occurrence of rainbow patterns on the smart glasses.

In a first aspect, the present application provides an optical waveguide plate including a waveguide substrate, a coupling-in region, and a coupling-out region, where the coupling-in region and the coupling-out region are disposed on the waveguide substrate, the coupling-in region is configured to couple light into the waveguide substrate, and the coupling-out region is configured to couple out the light propagating within the waveguide substrate; and a bottom edge of the coupling-out region is located above a horizontal bisector of the optical waveguide plate, or the bottom edge of the coupling-out region is entirely or partially flush with the horizontal bisector of the optical waveguide plate.

In a second aspect, the present application further provides a frame including a optical engine assembly, a rim, and an optical waveguide plate as described above, where the optical engine assembly is configured to emit display light; and the optical waveguide plate is fixedly mounted within the rim.

In a third aspect, the present application further provides smart glasses including an optical waveguide plate as described above.

The present application provides an optical waveguide plate, a frame, and smart glasses. The optical waveguide plate includes a waveguide substrate, a coupling-in region, and a coupling-out region; where the coupling-in region and the coupling-out region are disposed on the waveguide substrate, the coupling-in region is configured to couple light into the waveguide substrate, and the coupling-out region is configured to couple out the light propagating within the waveguide substrate; and a bottom edge of the coupling-out region is located above a horizontal bisector of the optical waveguide plate, or the bottom edge of the coupling-out region is flush with the horizontal bisector of the optical waveguide plate. In this way, by changing the position of the coupling-out region in the optical waveguide plate, the coupling-out region can be moved out of a central region of the primary field of view of the smart glasses, which effectively avoids the occurrence of diffractive rainbow stripes in the primary field-of-view region of the wearer, and can also ensure the implementation of AR imaging in an effective region.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show some embodiments of the present application, and those of ordinary skill in the art may derive other drawings from these accompanying drawings without creative efforts.

FIG. 2(*b*) is a schematic structural diagram of another optical waveguide plate in the related art according to an embodiment of the present application;

FIG. 3(*b*) is a schematic structural diagram of another optical waveguide plate according to an embodiment of the present application;

FIG. 5(*b*) is a schematic structural diagram of another coupling-out region according to an embodiment of the present application;

FIG. 15(*b*) is a schematic structural diagram of the shape of another optical waveguide plate according to an embodiment of the present application;

FIG. 15(*c*) is a schematic structural diagram of the shape of another optical waveguide plate according to an embodiment of the present application;

DETAILED DESCRIPTION OF EMBODIMENTS

The technical solutions in the embodiments of the present application will be clearly and completely described below in conjunction with the accompanying drawings in the embodiments of the present application. Apparently, the embodiments described are some rather than all of the embodiments of the present application. All other embodiments obtained by those of ordinary skill in the art based on the embodiments of the present application without creative efforts shall fall within the scope of protection of the present application.

The flowcharts shown in the accompanying drawings are merely examples for description, but do not necessarily include all content or operations/steps, and the operations/steps are not necessarily performed in the order described. For example, some operations/steps may alternatively be split, combined, or partially combined, and therefore an actual order of execution may change depending on an actual situation.

It should be understood that terms used in this specification of the present application are only for the purpose of describing specific embodiments, and are not intended to limit the present application. As used in this specification and the appended claims of the present application, the singular forms "a", "an", and "the" are intended to include plural forms, unless otherwise explicitly specified in the context.

It should be understood that the term "and/or" used in this specification and the appended claims of the present application indicates any combination and all possible combinations of one or more items listed in association, and includes the combinations.

Some implementations of the present application are described in detail below with reference to the accompanying drawings. The following embodiments and features in the embodiments may be mutually combined in case of no conflict.

Figure 1:
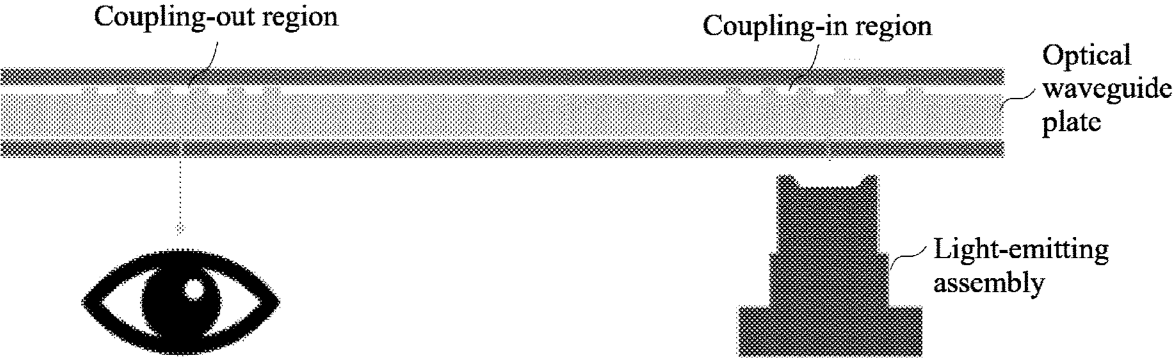
FIG. 1 is a schematic diagram of the implementation principle of an optical waveguide plate in the related art according to an embodiment of the present application.

Smart glasses typically achieve a display function through an optical waveguide solution (i.e., an optical waveguide plate). As shown in FIG. 1, an optical waveguide plate is one of main optical devices for imaging in an imaging system of smart glasses. Light emitted by an optical engine of the smart glasses is incident through a coupling-in region of the waveguide plate, diffracts in the coupling-in region of the optical waveguide, and then undergoes total reflection within a functional layer of the optical waveguide plate; and the light after the total reflection propagates to a coupling-out region, diffracts again in the coupling-out region, and then enters human eyes to form an image.

In AR glasses, an optical waveguide plate for imaging should not only display virtual projection information, but also allow transmission of light from the real world as regular glasses lenses, enabling superimposition of real-world images and virtual-world images. However, in grating regions (a coupling-in region and a coupling-out region) of the optical waveguide plate, natural light from the real world incident through the coupling-out region diffracts, so that when a user sees the real world through the smart glasses, some diffractive rainbow stripes that do not exist in reality will appear.

Figure 2A:
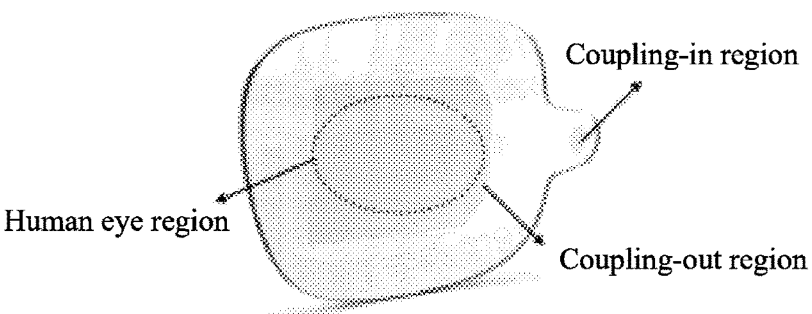
FIG. 2(*a*) is a schematic structural diagram of an optical waveguide plate in the related art according to an embodiment of the present application.
Figure 2B:
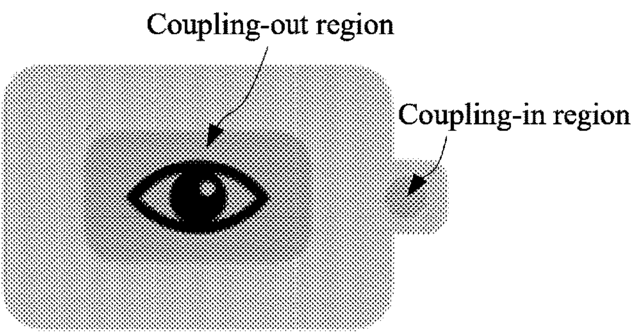

As shown in FIGS. 2(*a*) and 2(*b*), a coupling-out region of existing smart glasses is substantially in a primary field-of-view region at the center of the glasses lens, and in order to achieve the ultimate AR imaging quality and an immersive viewing experience, in existing smart glasses, the field of view (FOV) for imaging is increased, so the coupling-out region occupies more of a central region of the primary field of view of the lens. In this large coupling-out region, the visual effect of diffractive rainbow stripes is further amplified, making it impossible for a wearer to wear and use the glasses on a daily basis when not using an AR function.

In view of the above defects in the prior art, the present application proposes an optical waveguide plate, a frame, and smart glasses. The optical waveguide plate can be applied in smart glasses, and a coupling-out region can be moved out of a central region of a primary field of view of the smart glasses by changing the position of the coupling-out region in the optical waveguide plate, which effectively avoids the occurrence of diffractive rainbow stripes in the primary field-of-view region of the wearer, and can also ensure the implementation of AR imaging in an effective area.

Illustratively, the smart glasses may be augmented reality (AR) glasses or virtual reality (VR) glasses, or may also be any other electronic device that can be used for AR imaging, for example, a smart wearable device such as a smart helmet, which is not specifically limited herein.

Figure 3A:
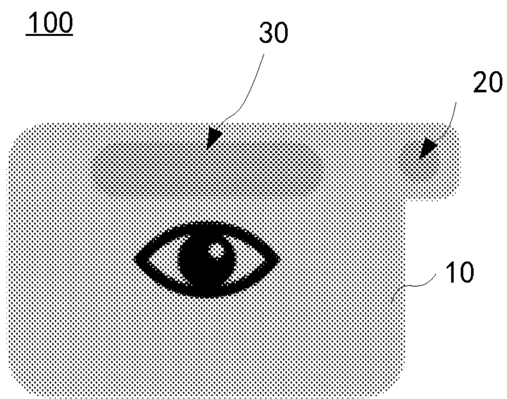
FIG. 3(*a*) is a schematic structural diagram of an optical waveguide plate according to an embodiment of the present application.
Figure 3B:
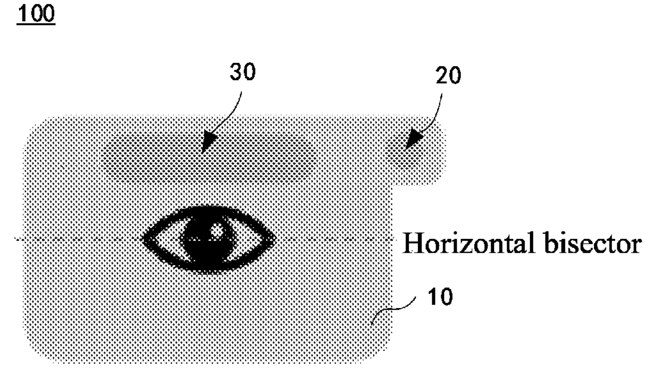

Referring to FIG. 3(*a*), FIG. 3(*a*) is a schematic structural diagram of an optical waveguide plate according to an embodiment of the present application.

As shown in FIG. 3(*a*), an optical waveguide plate 100 includes a waveguide substrate 10, a coupling-in region 20, and a coupling-out region 30. The coupling-in region 20 and the coupling-out region 30 are both disposed on the waveguide substrate 10, and the coupling-in region 20 and the coupling-out region 30 may be disposed at different positions on a first surface of the waveguide substrate 10. The coupling-in region 20 is configured to couple light into the waveguide substrate 10, and the coupling-out region 30 is configured to couple out the light propagating within the waveguide substrate 10.

The light diffracted in the coupling-in region 20 may undergo total reflection within the waveguide substrate 10, so that light laterally propagates until it reaches the coupling-out region 30 where the light is diffracted again and then directed to the human eye to form an image.

Illustratively, the coupling-in region 20 and the coupling-out region 30 may also be disposed on different surfaces of the waveguide substrate 10. For example, the coupling-in region 20 is disposed on the first surface of the waveguide substrate 10, and the coupling-out region 30 is disposed on a second surface of the waveguide substrate 10; alternatively, the coupling-out region 30 is disposed on the first surface of the waveguide substrate 10, and the coupling-in region 20 is disposed on the second surface of the waveguide substrate 10. As long as the coupling-in region 20 can be used for coupling the light into the waveguide substrate 10, and the coupling-out region 30 can be configured to couple out the light propagating within the waveguide substrate 10.

Illustratively, the position of the coupling-in region 20 at the waveguide substrate 10 may be set according to the position of a optical engine assembly 200, only if the coupling-in region 20 is capable of receiving the light emitted by the optical engine assembly 200.

Specifically, a central position of the coupling-out region 30 is located above a projection position of the pupil center of the wearer's eye on the optical waveguide plate.

Figure 4:
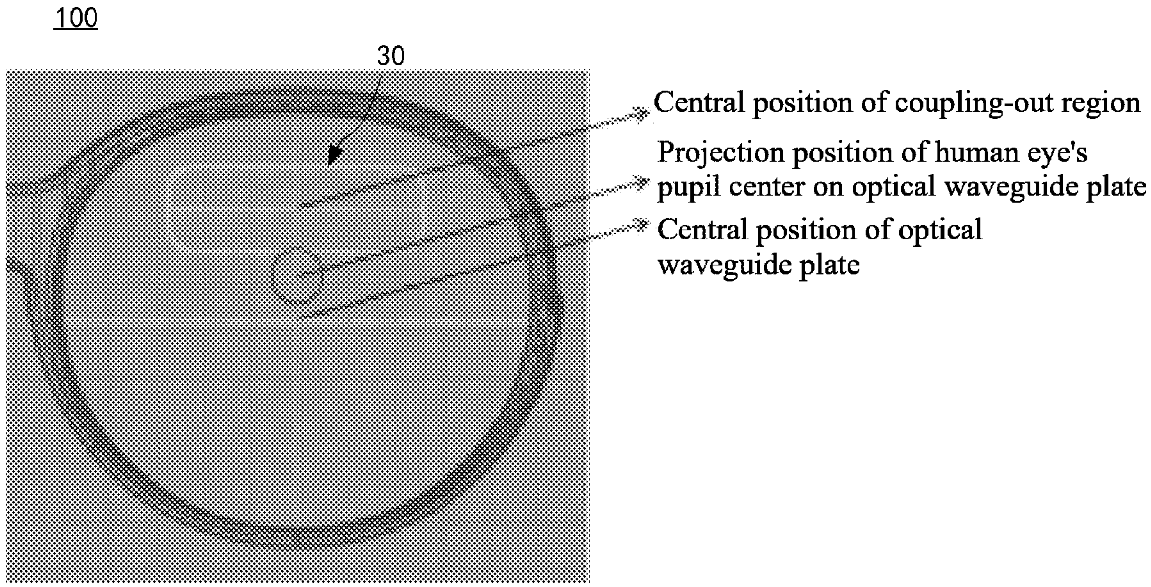
FIG. 4 is a schematic diagram of an application scenario of an optical waveguide plate according to an embodiment of the present application.

As shown in FIG. 4, typically, an intersection point between the line of sight of the human eye when looking straight ahead and the optical waveguide plate 100 is not a central position of the optical waveguide plate, and the intersection point between the line of sight of the human eye when looking straight ahead and the optical waveguide plate 100 can be located at the golden ratio point (0.618) of the optical waveguide plate 100. In other words, the projection position of the pupil center of the human eye on the optical waveguide plate 100 is not the same as the central position of the optical waveguide plate 100, and the projection position of the pupil center of the human eye on the optical waveguide plate 100 can be located above the central position of the optical waveguide plate 100. Therefore, in this case, the primary field-of-view region of the smart glasses is the field-of-view region centered on the projection position of the pupil center of the human eye on the optical waveguide plate 100.

The coupling-out region 30 may overlap with the primary field-of-view region of the smart glasses, and the coupling-out region 30 may not overlap with the primary field-of-view region of the smart glasses, which is not specifically defined herein. It will be appreciated that as long as the central position of the coupling-out region 30 is located above the projection position of the pupil center of the wearer's eye on the optical waveguide plate 100, the occurrence of diffractive rainbow stripes in the primary field-of-view region of the wearer can be effectively reduced.

It should be noted that the central position of the coupling-out region 30 may be a center point or a central region of the coupling-out region 30, which is not specifically defined herein. The central position of the coupling-out region 30 being located above the projection position of the pupil center of the wearer's eye on the optical waveguide plate 100 can be represented as the central position of the coupling-out region 30 being located above the projection position of the pupil center of the wearer's eye on the optical waveguide plate 100 in a y-axis direction.

Illustratively, the central position of the coupling-out region 30 may be located on the left above the projection position of the pupil center of the wearer's eye on the optical waveguide plate 100, or may be located directly above the projection position of the pupil center of the wearer's eye on the optical waveguide plate 100, or may also be located on the right above the projection position of the pupil center of the wearer's eye on the optical waveguide plate 100, which is not specifically defined herein.

Moreover, the projection position of the pupil center of the wearer's eye on the optical waveguide plate 100 may be at a left portion of the optical waveguide plate 100, at a middle portion of the optical waveguide plate 100, or at a right portion of the optical waveguide plate 100, as long as the central position of the coupling-out region 30 is located above the projection position of the pupil center of the wearer's eye on the optical waveguide plate 100.

An x-axis direction may be a horizontal direction of the coupling-out region 30 in a plane in which the line of sight of the wearer when looking straight ahead is located, that is, a direction of length of the coupling-out region 30; the y-axis direction may be a vertical direction of the coupling-out region 30 in the plane in which the line of sight of the wearer when looking straight ahead is located, that is, a direction of width of the coupling-out region 30; and a z-axis direction may be a direction of the line of sight of the wearer when looking straight ahead, and is perpendicular to the x-axis direction and the y-axis direction, that is, a direction of thickness of the coupling-out region 30.

An embodiment of the present application provides an optical waveguide plate 100, the optical waveguide plate 100 including a waveguide substrate 10, a coupling-in region 20, and a coupling-out region 30. The coupling-in region 20 and the coupling-out region 30 are disposed on the waveguide substrate 10, the coupling-in region 20 is configured to couple light into the waveguide substrate 10, and the coupling-out region 30 is configured to couple out the light propagating within the waveguide substrate 10. A central position of the coupling-out region 30 is located above a projection position of the pupil center of the wearer's eye on the optical waveguide plate 100. In this way, by changing the position of the coupling-out region 30 in the optical waveguide plate 100, the coupling-out region 30 can be moved out of a central region of a primary field of view of smart glasses, which effectively avoids the occurrence of diffractive rainbow stripes in the primary field-of-view region of the wearer, and can also ensure the implementation of AR imaging in an effective area, enabling clear and accurate viewing of the information displayed in the coupling-out region 30 by the wearer even with a slight upward glance.

As shown in FIG. 3(*b*), in some embodiments, the optical waveguide plate 100 includes a waveguide substrate 10, a coupling-in region 20, and a coupling-out region 30. The coupling-in region 20 and the coupling-out region 30 are both disposed on the waveguide substrate 10, and the coupling-in region 20 and the coupling-out region 30 may be disposed at different positions on a first surface of the waveguide substrate 10. The coupling-in region 20 is configured to couple light into the waveguide substrate 10, and the coupling-out region 30 is configured to couple out the light propagating within the waveguide substrate 10.

The light diffracted in the coupling-in region 20 may undergo total reflection within the waveguide substrate 10, so that light laterally propagates until it reaches the coupling-out region 30 where the light is diffracted again and then directed to the human eye to form an image.

Illustratively, the coupling-in region 20 and the coupling-out region 30 may also be disposed on different surfaces of the waveguide substrate 10. For example, the coupling-in region 20 is disposed on the first surface of the waveguide substrate 10, and the coupling-out region 30 is disposed on a second surface of the waveguide substrate 10; alternatively, the coupling-out region 30 is disposed on the first surface of the waveguide substrate 10, and the coupling-in region 20 is disposed on the second surface of the waveguide substrate 10. As long as the coupling-in region 20 can be used for coupling the light into the waveguide substrate 10, and the coupling-out region 30 can be configured to couple out the light propagating within the waveguide substrate 10.

Illustratively, the position of the coupling-in region 20 at the waveguide substrate 10 may be set according to the position of a optical engine assembly 200, only if the coupling-in region 20 is capable of receiving the light emitted by the optical engine assembly 200.

Specifically, a bottom edge of the coupling-out region 30 is located above a horizontal bisector of the optical waveguide plate 100, or the bottom edge of the coupling-out region 30 is entirely or partially flush with the horizontal bisector of the optical waveguide plate 100.

The bottom edge of the coupling-out region 30 may be a parallel line that passes through the lowermost end point of the coupling-out region 30 in the vertical direction (i.e., the y-axis direction) is located.

Illustratively, when a lower edge of the coupling-out region 30 is a parallel line, for example, when the coupling-out region 30 is a rectangle and the like, the lower edge of the coupling-out region 30 may be a lower bottom edge of the rectangle in this case; and when the lower edge of the coupling-out region 30 is an arc and the like, the lower edge of the coupling-out region 30 may be a parallel line that passes through the apex of the arc. The bottom edge of the coupling-out region 30 may be set according to different situations, which is not specifically defined herein.

As shown in FIG. 2(*b*), typically, the coupling-out region 30 is generally located in the middle of the optical waveguide plate 100, that is, the bottom edge of the coupling-out region 30 is located below the horizontal bisector of the optical waveguide plate 100. Thus, the coupling-out region 30 and the primary field-of-view region of the smart glasses may have a large overlap in this case, causing a large number of diffractive rainbow stripes in the primary field-of-view region of the wearer.

As shown in FIG. 3(*b*), the bottom edge of the coupling-out region 30 is located above the horizontal bisector of the optical waveguide plate 100, or the bottom edge of the coupling-out region 30 is entirely or partially flush with the horizontal bisector of the optical waveguide plate 100. Since the rainbow patterns appear due to the grating at the bottom edge of the optical waveguide plate 100, moving the coupling-out region 30 upward can reduce the occurrence of diffractive rainbow stripes in the primary field-of-view region of the wearer. Experiments show that configuring at least the bottom edge of the coupling-out region 30 to be flush with or located above the horizontal bisector of the optical waveguide plate 100 can effectively reduce the occurrence of diffractive rainbow stripes in the primary field-of-view region of the wearer and can thus substantially eliminate the impact of the rainbow patterns on the wearer.

Illustratively, the bottom edge of the coupling-out region 30 may be located on the left above the horizontal bisector of the optical waveguide plate 100, or may be located directly above the horizontal bisector of the optical waveguide plate 100, or may also be located on the right above the horizontal bisector of the optical waveguide plate 100, which is not specifically defined herein, as long as the bottom edge of the coupling-out region 30 is located above the horizontal bisector of the optical waveguide plate 100 or flush with the horizontal bisector of the optical waveguide plate 100.

An embodiment of the present application provides an optical waveguide plate 100, the optical waveguide plate 100 including a waveguide substrate 10, a coupling-in region 20, and a coupling-out region 30. The coupling-in region 20 and the coupling-out region 30 are disposed on the waveguide substrate 10, the coupling-in region 20 is configured to couple light into the waveguide substrate 10, and the coupling-out region 30 is configured to couple out the light propagating within the waveguide substrate 10. A bottom edge of the coupling-out region 30 is located above a horizontal bisector of the optical waveguide plate 100, or the bottom edge of the coupling-out region 30 is entirely or partially flush with the horizontal bisector of the optical waveguide plate 100. Since a person looks forward and downward most of the time in daily life, the primary field-of-view region of the wearer is located slightly below the middle of the optical waveguide plate 100. In the present application, the coupling-out region 30 can be moved out of the central region of a primary field of view of smart glasses by changing the position of the coupling-out region 30 in the optical waveguide plate 100, which effectively avoids the occurrence of diffractive rainbow stripes in the primary field-of-view region of the wearer, and can also ensure the implementation of AR imaging in an effective area, enabling clear and accurate viewing of the information displayed in the coupling-out region 30 by the wearer even with a slight upward glance.

In some embodiments, the central position of the coupling-out region 30 includes one of a center point of the coupling-out region 30 and a bisector in the horizontal direction. In this way, the central position of the coupling-out region 30 can be accurately determined even when the coupling-out region 30 has an irregular shape.

The center point of the coupling-out region 30 may be a center point of a corresponding shape of the coupling-out region 30; and the bisector in the horizontal direction of the coupling-out region 30 is equidistant from the upper edge and the lower edge of the coupling-out region 30.

Specifically, in the case where it is relatively easy to determine the center point of the coupling-out region 30, for example, when the coupling-out region 30 has a regular shape, the center point of the coupling-out region 30 can be rapidly determined through a simple calculation; and when the coupling-out region 30 has an irregular shape, the center point can be determined by locating the center of the circumscribed circle of the coupling-out region 30.

Specifically, in the case where it is difficult to determine the center point of the coupling-out region 30, for example, when the coupling-out region 30 has an irregular shape, the bisector of the coupling-out region 30 in the horizontal direction can be located by determining a horizontal line that is equidistant from the upper edge and the lower edge of the coupling-out region 30.

Illustratively, in the case where the upper edge or the lower edge is an irregular line, for example, when the upper edge or the lower edge is a line such as an arc, the bisector of the coupling-out region 30 in the horizontal direction can be located by determining the midpoint of the upper edge and the midpoint of the lower edge and then locating a horizontal line that is equidistant from the midpoint of the upper edge and the midpoint of the lower edge.

The horizontal direction may be the x-axis direction, that is, the direction of length of the coupling-out region 30. Typically, the coupling-out region 30 is in a regular shape of a rectangle, a rounded rectangle, etc., so that the central position of the coupling-out region 30 can be determined by locating the center point of the coupling-out region 30.

Figure 5A:
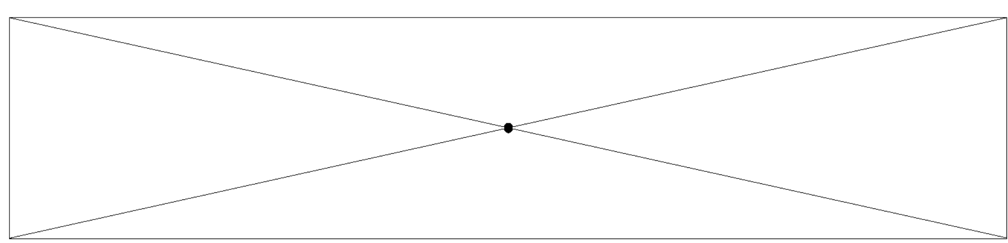
FIG. 5(*a*) is a schematic structural diagram of a coupling-out region according to an embodiment of the present application.
Figure 5B:
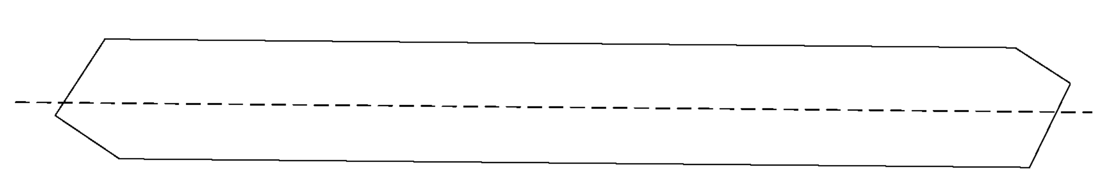

As shown in FIG. 5(*a*), illustratively, when the coupling-out region 30 is in the shape of a rectangle, the center point of the coupling-out region 30 may be determined by an intersection of diagonal lines of the rectangle, and the central position of the coupling-out region 30 is thus accurately determined.

As shown in FIG. 5(*b*), illustratively, when the coupling-out region 30 has an irregular shape, a horizontal line that is equidistant from the upper edge and the lower edge of the coupling-out region 30 can be located, and the midpoint of the horizontal line is used as the central position of the coupling-out region 30.

Figure 6:
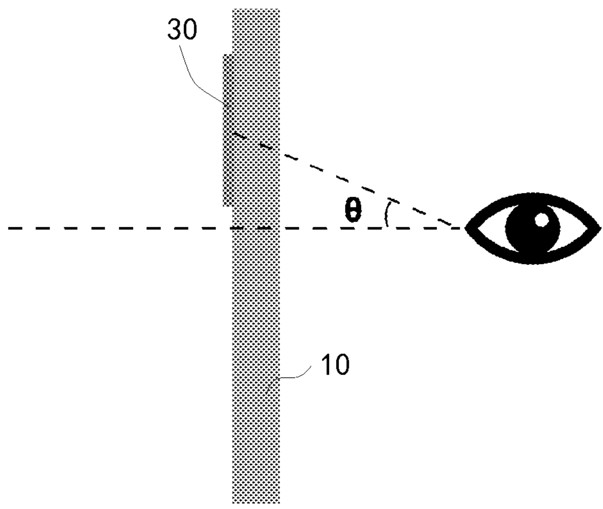
FIG. 6 is a schematic diagram of an application scenario of another optical waveguide plate according to an embodiment of the present application.

As shown in FIG. 6, the central position of the coupling-out region 30 and the projection position of the pupil center of the human eye on the optical waveguide plate 100 form a preset included angle θ relative to the projection of the pupil center of the wearer's eye on a plane in which the cross-section of the optical waveguide plate 100 is located, the preset included angle θ being less than or equal to 30°. In this way, it is possible to eliminate the need for the wearer to make a significant upward eye movement for clear and accurate viewing of the information displayed in the coupling-out region 30 to cause high degree of visual fatigue of the wearer wearing the glasses, because the coupling-out region is located too high and thus the AR imaging region 30 is located too high.

The preset included angle θ is formed by the central position of the coupling-out region 30 and the projection position of the pupil center of the human eye on the optical waveguide plate 100 relative to the plane in which the pupil center of the wearer's eye is located in the cross-section of the optical waveguide plate 100.

It will be appreciated that the diffractive rainbow stripes in the primary field-of-view region of the wearer can be reduced, as long as the central position of the coupling-out region 30 and the projection position of the pupil center of the human eye on the optical waveguide plate 100 form a preset included angle θ relative to the projection of the pupil center of the wearer's eye on the plane in which the cross-section of the optical waveguide plate 100 is located, and the central position of the coupling-out region 30 is located above the projection position of the pupil center of the human eye on the optical waveguide plate 100.

Figure 7:
FIG. 7 is a schematic diagram of a preset included angle θ as a function of the degree of visual fatigue according to an embodiment of the present application.
Figure 7:
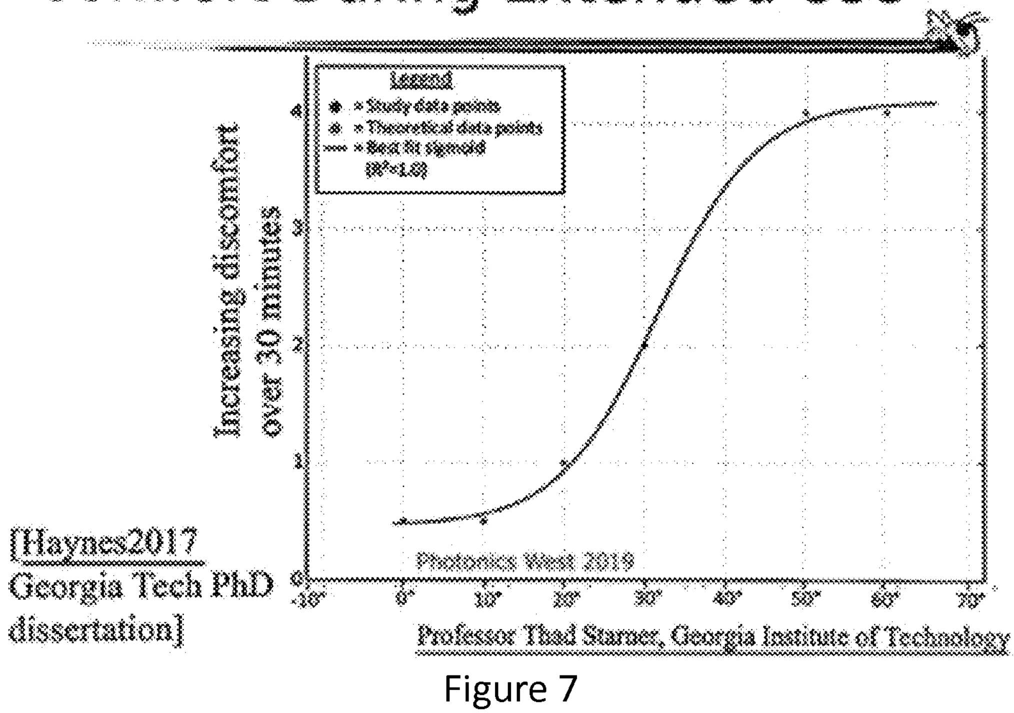

Referring to FIG. 7. FIG. 7 is a schematic diagram of a preset included angle θ as a function of a degree of visual fatigue according to an embodiment of the present application. As shown in FIG. 7, when the preset included angle θ is greater than 30°, since the coupling-out region 30 is located too high, the wearer needs to look upward for an extended period with a significantly large upward eye movement for clear and accurate viewing of the information displayed in the coupling-out region 30, and in this case the degree of visual fatigue of the wearer exceeds 2 after wearing the glasses for more than 30 minutes, indicating that the wearer experiences significant discomfort after wearing the glasses for more than 30 minutes. Therefore, the preset included angle θ needs to be set to less than or equal to 30°.

In some embodiments, the central position of the coupling-out region 30 and the projection position of the pupil center of the human eye on the optical waveguide plate 100 form a preset included angle θ relative to the projection of the pupil center of the wearer's eye on a plane in which the cross-section of the optical waveguide plate 100 is located, the preset included angle θ being greater than or equal to 10° and less than or equal to 20°. In this way, the coupling-out region 30 can be set within the optimal range, it is possible to effectively eliminate most of the diffractive rainbow stripes in the primary field-of-view region of the wearer, without causing a high degree of visual fatigue for the wearer when wearing the glasses.

As shown in FIG. 7, when the preset included angle θ is less than 10°, the coupling-out region 30 may still overlap with the primary field-of-view region of the wearer due to the small preset included angle θ, so that a small number of diffractive rainbow stripes may still appear in the primary field-of-view region of the wearer, that is, the optimal effect of elimination of the diffractive rainbow stripes has not been achieved. When the preset included angle θ is greater than 20° and less than or equal to 30°, as the preset included angle θ increases, the rise of increase of the degree of visual fatigue gradually increases, so that when the preset included angle θ is set to 20°, the diffractive rainbow stripes can be minimized, without causing fatigue for the wearer when wearing the smart glasses for an extended period.

In some embodiments, the coupling-out region 30 is in the form of a rectangle or a rounded rectangle. In this way, the length of the coupling-out region 30 may be set greater than the width of the coupling-out region 30, thereby reducing the visibility of the diffractive rainbow stripes for the wearer's eye.

Specifically, by reducing the width of the coupling-out region 30, reflected natural light is less likely to enter the human eye after diffraction, so as to prevent creation of rainbow patterns.

In some embodiments, the length of the coupling-out region 30 is greater than or equal to twice the width of the coupling-out region 30, the length of the coupling-out region 30 is an extension of the coupling-out region 30 in the horizontal direction, and the width of the coupling-out region 30 is an extension of the coupling-out region 30 in the vertical direction. In this way, the width of the coupling-out region 30 may be minimized, thereby reducing the visibility of the diffractive rainbow stripes for the wearer's eye.

The direction of length of the coupling-out region 30 may be the horizontal direction of the coupling-out region 30 in the plane in which the line of sight of the wearer when looking straight ahead is located, that is, the x-axis direction; and the direction of width of the coupling-out region 30 may be the vertical direction of the coupling-out region 30 in the plane in which the line of sight of the wearer when looking straight ahead is located, that is, the y-axis direction.

Specifically, the distance between a lower boundary of the coupling-out region 30 and an upper boundary of the primary field-of-view region can be minimized by setting the length of the coupling-out region 30 to be greater than or equal to twice the width of the coupling-out region 30, so that the visibility of the diffractive rainbow stripes for the wearer's eye can be reduced.

In some embodiments, the length of the coupling-out region 30 may be greater than or equal to 3 times the width of the coupling-out region 30. In this way, by reducing the width of the coupling-out region 30 to a certain extent, the visibility of the diffractive rainbow stripes for the wearer's eye can be minimized.

Specifically, when the length of the coupling-out region 30 is greater than or equal to 3 times the width of the coupling-out region 30, it is indicated that the distance between the lower boundary of the coupling-out region 30 and the upper boundary of the primary field-of-view region is relatively narrow, and thus indicated that the visibility of the diffractive rainbow stripes for the wearer's eye can be minimized.

It should be noted that the width of the coupling-out region 30 cannot be set too small. When the width of the coupling-out region 30 is set too small, the coupling-out region 30 may appear as a small bar, resulting in too few lines of text displayed in the coupling-out region 30.

Figure 8:
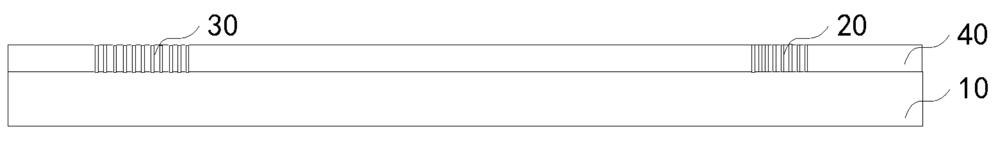
FIG. 8 is a schematic structural cross-sectional view of an optical waveguide plate according to an embodiment of the present application.

As shown in FIG. 8, in some embodiments, the waveguide substrate 10 further includes a grating layer 40. The grating layer 40 is disposed on the waveguide substrate 10 to form the coupling-in region 20 and/or the coupling-out region 30. The coupling-in region 20 and/or the coupling-out region 30 can thus be formed on the waveguide substrate 10 by grating coupling.

The grating layer 40 has a thickness ranging from 10 nanometers to 500 nanometers. This allows the grating layer 40 to be set so thin that the light transmittance of the grating layer 40 is increased.

Illustratively, the grating layer 40 may be disposed on a first surface of the waveguide substrate 10, or on a second surface of the waveguide substrate 10, or inside the waveguide of the waveguide substrate 10, which is not specifically defined herein. The first surface of the waveguide substrate 10 may be a surface away from the wearer; and the second surface of the waveguide substrate 10 may be a surface close to the wearer.

Illustratively, a liquefied nano-imprint adhesive may be applied on the first surface of the waveguide substrate 10, and nano-imprinting is performed using a mold, so as to form a nano-scale diffraction grating structure on the first surface of the waveguide substrate 10. The nano-imprint adhesive is then subjected to an ultraviolet curing operation, so as to form the coupling-in region 20 and the coupling-out region 30 of a fixed shape.

Illustratively, nano-scale diffraction gratings may be formed on the first surface or the second surface of the waveguide substrate 10 by means of etching such as photolithography/ion beam etching, followed by subsequent process operations such as cleaning, so as to form the coupling-in region 20 and the coupling-out region 30 of a specific shape.

Illustratively, the coupling-in and coupling-out regions may be volume holographic gratings. Specifically, the waveguide substrate 10 may be coated with an organic film, and the film is then exposed to interference fringes generated by two laser beams such that the bright and dark interference fringes induce different exposure characteristics of the material, resulting in a periodic refractive index contrast (An) within the film, so that, a diffraction grating is generated.

In some embodiments, the optical waveguide plate 100 further includes a first anti-reflection coating 41. The first anti-reflection coating 41 is disposed on a surface of the grating layer 40. In this way, by providing an anti-reflection coating on the surface of the grating layer 40, the light transmittance of the grating layer 40 can be improved.

In smart glasses, related technologies focus on improving the virtual reality imaging quality of the optical waveguide plate, but neglect the transmittance of the optical waveguide plate to the light from the real world, resulting in the transmittance of the light from the real world generally below 80% in the grating regions (the coupling-in region and the coupling-out region) and below 85% in non-grating regions (a non-coupling-in region and a non-coupling-out region). The low optical transmittance in the grating region makes the real world viewed through the smart glasses appear dim and blurry, so that it is difficult for the user to wear the smart glasses for an extended period, especially during activities in the real world.

Specifically, since the optical transmittance of the grating layer 40 of the existing optical waveguide plate 100 is generally low, generally below 85%, an anti-reflection (AR) coating may be applied on the surface of the grating layer 40 to form the first anti-reflection coating 41, thereby increasing the light transmittance of the grating layer 40.

Figure 9:
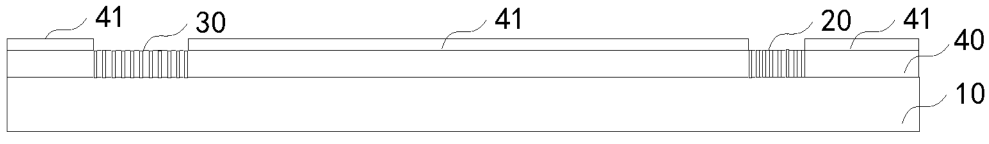
FIG. 9 is a schematic structural cross-sectional view of another optical waveguide plate according to an embodiment of the present application.

As shown in FIG. 9, in some embodiments, the first anti-reflection coating 41 is disposed around the coupling-in region 20 and the coupling-out region 30, and the first anti-reflection coating 41 does not cover the coupling-in region 20 and the coupling-out region 30. The provision of the anti-reflection coating on the surface of the grating layer 40 around the coupling-in region 20 and the coupling-out region 30 can simplify the coating process, reduce the coating cost, and avoid impact on the diffraction effect of the grating.

Specifically, an anti-reflection (AR) coating may be applied on the surface of the grating layer 40 around the coupling-in region 20 and the coupling-out region 30 to form the first anti-reflection coating 41, and the first anti-reflection coating 41 does not cover the coupling-in region 20 and the coupling-out region 30.

Figure 10:
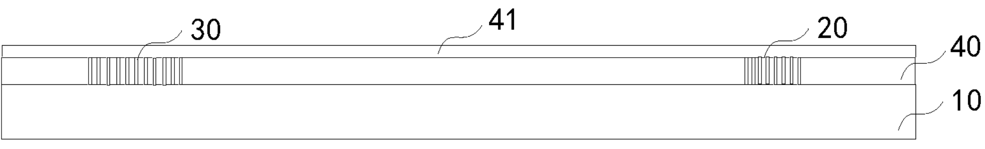
FIG. 10 is a schematic structural cross-sectional view of another optical waveguide plate according to an embodiment of the present application.

As shown in FIG. 10, in some embodiments, the first anti-reflection coating 41 covers the coupling-in region 20 and the coupling-out region 30. In this way, by providing an anti-reflection coating disposed on the surface of the grating layer 40 and covering the coupling-in region 20 and the coupling-out region 30, the light transmittance of the coupling-in region 20 and the coupling-out region 30 can be improved, and the visual perception can be improved.

Specifically, an anti-reflection (AR) coating may be applied on the surface of the grating layer 40 and covering the coupling-in region 20 and the coupling-out region 30 to form the first anti-reflection coating 41, thereby improving the light transmittance of the coupling-in region 20 and the coupling-out region 30 and improving the visual perception.

Figure 11:
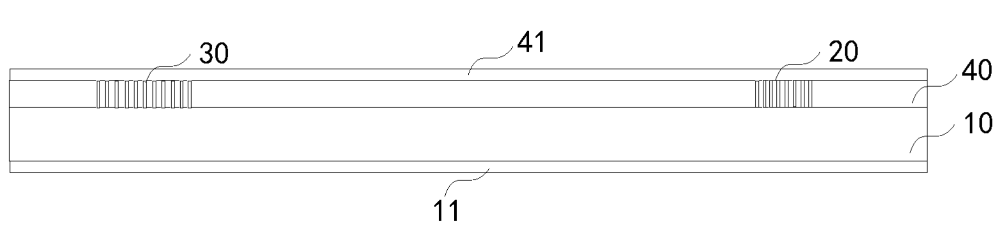
FIG. 11 is a schematic structural cross-sectional view of another optical waveguide plate according to an embodiment of the present application.

As shown in FIG. 11, in some embodiments, the optical waveguide plate 100 may further include a second anti-reflection coating 11. The second anti-reflection coating 11 is disposed on a second surface of the waveguide substrate 10. In this way, by providing an anti-reflection coating on the second surface of the waveguide substrate 10, the light transmittance of the waveguide substrate 10 can be improved.

Specifically, an anti-reflection (AR) coating may be applied on the second surface of the waveguide substrate 10 to form the second anti-reflection coating 11, thereby improving the light transmittance of the waveguide substrate 10.

Figure 12:
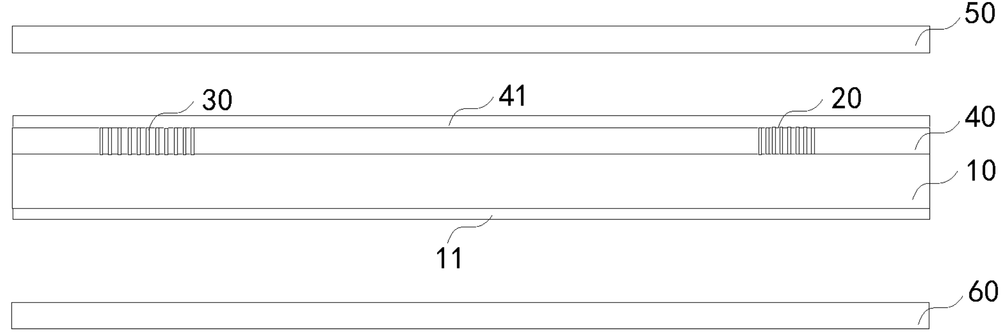
FIG. 12 is a schematic structural cross-sectional view of another optical waveguide plate according to an embodiment of the present application.

As shown in FIG. 12, in some embodiments, the optical waveguide plate 100 may further include a first protective lens 50 and a second protective lens 60. The first protective lens 50 is disposed on a side away from the wearer, and the first protective lens 50 is stacked on the grating layer 40; and a second protective lens 60 is disposed on a side close to the wearer, and the second protective lens 60 is stacked on the second surface of the waveguide substrate 10. This can ensure that total reflection of light within the waveguide substrate 10 of the optical waveguide plate 100 is not affected by external contaminants.

The first protective lens 50, the second protective lens 60 and the waveguide substrate 10 are generally made of resin or a glass flat sheet, which ensures that the total reflection of the light within the waveguide substrate 10 of the optical waveguide plate 100 is not affected by the external contaminants such as grease and water.

Specifically, light from the real world is incident from a distal eye side, successively passes through the first protective lens 50, the grating layer 40, the waveguide substrate 10 and the second protective lens 60, and finally exits from a proximal eye side and enters the human eye.

Illustratively, the first protective lens 50 is disposed on a side away from the wearer, and the first protective lens 50 is stacked on the grating layer 40, thereby ensuring that the external contaminants such as grease and water cannot enter the waveguide substrate 10 on the distal eye side; and the second protective lens 60 is disposed on a side close to the wearer, and the second protective lens 60 is stacked on the second surface of the waveguide substrate 10, thereby ensuring that the external contaminants such as grease and water cannot enter the waveguide substrate 10 on the proximal eye side, so as to ensure that the total reflection of the light within the waveguide substrate 10 is not disturbed.

Figure 13:
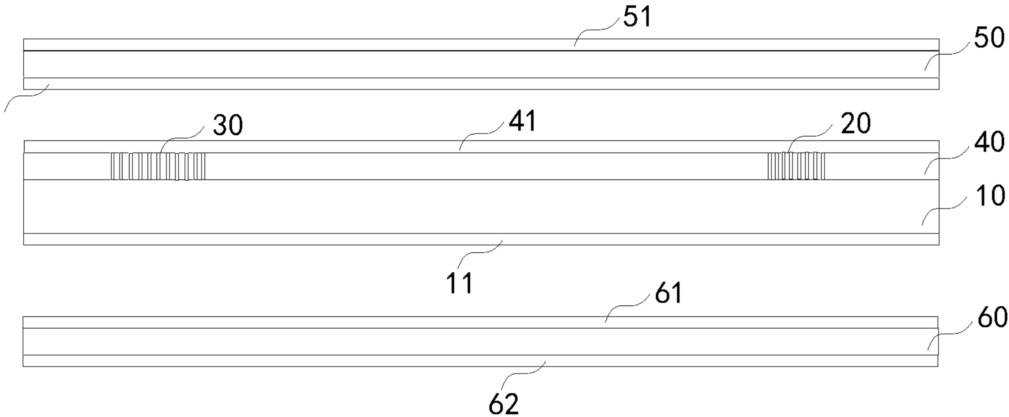
FIG. 13 is a schematic structural cross-sectional view of another optical waveguide plate according to an embodiment of the present application.

As shown in FIG. 13, in some embodiments, the optical waveguide plate 100 may further include one or more of a third anti-reflection coating 51, a fourth anti-reflection coating 52, a fifth anti-reflection coating 61 or a sixth anti-reflection coating 62. The third anti-reflection coating 51 is disposed on a first surface of the first protective lens 50; and/or the fourth anti-reflection coating 52 is disposed on a second surface of the first protective lens 50; and/or the fifth anti-reflection coating 61 is disposed on a first surface of the second protective lens 60; and/or the sixth anti-reflection coating 62 is disposed on a second surface of the second protective lens 60. In this way, by providing the anti-reflection coating on the surface of the first protective lens 50 and/or the second protective lens 60, the light transmittance of the first protective lens 50 and/or the second protective lens 60 can be improved.

Illustratively, an anti-reflection (AR) coating may be applied on the first surface of the first protective lens 50 to form the third anti-reflection coating 51, thereby improving the light transmittance of the light entering the first protective lens 50.

Illustratively, an anti-reflection (AR) coating may be applied on the second surface of the first protective lens 50 to form the fourth anti-reflection coating 52, thereby improving the light transmittance of the light exiting the first protective lens 50.

Illustratively, an anti-reflection (AR) coating may be applied on the first surface of the second protective lens 60 to form the fifth anti-reflection coating 61, thereby improving the light transmittance of the light entering the second protective lens 60.

Illustratively, an anti-reflection (AR) coating may be applied on the second surface of the second protective lens 60 to form the sixth anti-reflection coating 62, thereby improving the light transmittance of the light exiting the second protective lens 60.

It should be noted that the optical waveguide plate 100 may be provided with all the third anti-reflection coating 51, the fourth anti-reflection coating 52, the fifth anti-reflection coating 61 and the sixth anti-reflection coating 62, or may be provided with one or more of the third anti-reflection coating 51, the fourth anti-reflection coating 52, the fifth anti-reflection coating 61 and the sixth anti-reflection coating 62, which is not specifically defined herein. Generally, when the third anti-reflection coating 51, the fourth anti-reflection coating 52, the fifth anti-reflection coating 61 and the sixth anti-reflection coating 62 are all provided on the optical waveguide plate 100, the optical waveguide plate 100 has the highest light transmittance, with the light transmittance being greater than 90% in the coupling-out region 30 and greater than 95% in the non-coupling-out region 30, and no rainbow pattern appears in the field of view.

In some embodiments, the waveguide substrate 10, the grating layer 40, the first protective lens 50 and the second protective lens 60 each include a material with a refractive index less than or equal to 2. In this way, by making the waveguide substrate 10, the grating layer 40, the first protective lens 50 and the second protective lens 60 from materials with low refractive index, the light transmittance of the optical waveguide plate 100 can be improved.

The waveguide substrate 10, the grating layer 40, the first protective lens 50 and the second protective lens 60 each include a material with a refractive index less than or equal to 2, for example, 1.8, which is not specifically defined herein.

Illustratively, a material with a refractive index of 1.8 may be selected to make the waveguide substrate 10, the grating layer 40, the first protective lens 50 and the second protective lens 60.

Figure 14:
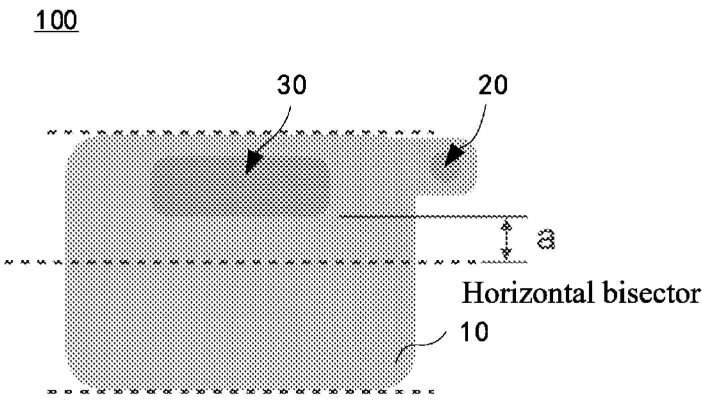
FIG. 14 is a schematic structural diagram of another optical waveguide plate according to an embodiment of the present application.

As shown in FIG. 14, in some embodiments, a distance between the bottom edge of the coupling-out region 30 and the horizontal bisector of the optical waveguide plate 100 is greater than or equal to 2 mm. In this way, by setting the coupling-out region 30 within the optimal range, the occurrence of diffractive rainbow stripes in the primary field-of-view region of the wearer can be minimized.

Specifically, the distance a between the bottom edge of the coupling-out region 30 and the horizontal bisector of the optical waveguide plate 100 may be determined based on parameters such as the period of the coupling-out region 30. Typically, when the distance a between the bottom edge of the coupling-out region 30 and the horizontal bisector of the optical waveguide plate 100 is greater than or equal to 2 mm, by setting the coupling-out region 30 within the optimal range, the occurrence of diffractive rainbow stripes in the primary field-of-view region of the wearer can be eliminated to the greatest extent.

Illustratively, as shown in FIG. 14, when the coupling-out region 30 is in the form of a rectangle, the distance a between the bottom edge of the rectangle and the horizontal bisector of the optical waveguide plate 100 may be set to be greater than or equal to 2 mm.

Illustratively, when the coupling-out region 30 is in the form of an irregular pattern, the distance a between a parallel line on the bottom-most side of the bottom edge of the irregular pattern and the horizontal bisector of the optical waveguide plate 100 may be set to be greater than or equal to 2 mm.

Figure 15A:
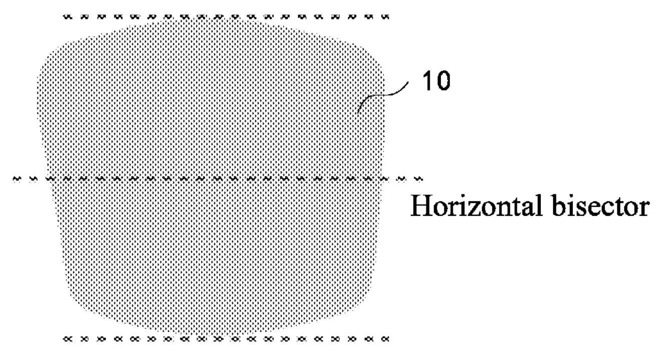
FIG. 15(*a*) is a schematic structural diagram of the shape of an optical waveguide plate according to an embodiment of the present application.
Figure 15B:
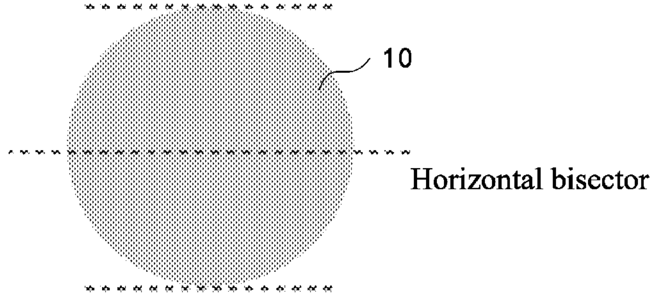
Figure 15C:
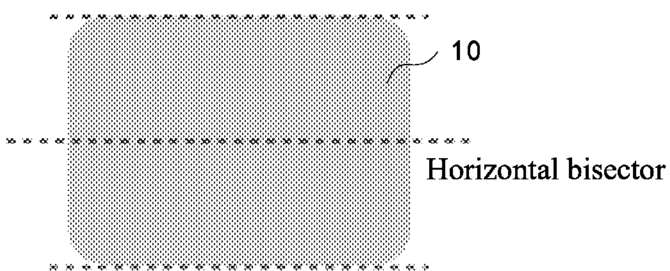

As shown in FIGS. 15(*a*), 15(*b*) and 15(*c*), in some embodiments, the optical waveguide plate 100 is in the form of a circle, an ellipse, a rounded rectangle, or an irregular pattern.

Illustratively, the optical waveguide plate 100 may be in the form of a circle, an ellipse, a rounded rectangle, or an irregular pattern, etc., which is not specifically defined herein.

In some embodiments, the horizontal bisector of the optical waveguide plate 100 includes one of a horizontal line corresponding to a center point of the optical waveguide plate 100, and a bisector in the horizontal direction. In this way, the horizontal bisector of the coupling-out region 30 can be accurately determined even when the optical waveguide plate 100 has an irregular shape.

The horizontal bisector of the optical waveguide plate 100 may be the bisector in the horizontal direction of the optical waveguide plate 100; and the bisector in the horizontal direction of the optical waveguide plate 100 is equidistant from the upper edge and the lower edge of the optical waveguide plate 100.

Specifically, in the case where it is relatively easy to determine the horizontal bisector of the optical waveguide plate 100, for example, when the optical waveguide plate 100 has a regular shape, the center point of the optical waveguide plate 100 can be rapidly determined through a simple calculation; and when the optical waveguide plate 100 has an irregular shape, the center point can be determined by locating the center of a circumscribed circle of the optical waveguide plate 100, and the horizontal line passing through the center point can be used as the horizontal bisector of the optical waveguide plate 100.

Specifically, in the case where it is difficult to determine the center point of the optical waveguide plate 100, for example, when the optical waveguide plate 100 has an irregular shape, the horizontal bisector of the optical waveguide plate 100 can be located by determining a horizontal line that is equidistant from the upper edge and the lower edge of the optical waveguide plate 100.

Illustratively, in the case where the upper edge or the lower edge is an irregular line, for example, when the upper edge or the lower edge is a line such as an arc, the horizontal bisector of the optical waveguide plate 100 can be located by determining the midpoint of the upper edge and the midpoint of the lower edge and then locating a horizontal line that is equidistant from the midpoint of the upper edge and the midpoint of the lower edge.

The horizontal direction may be the x-axis direction, that is, the direction of length of the coupling-out region 30.

Illustratively, as shown in FIG. 15(*a*), when the optical waveguide plate 100 has an irregular shape, the horizontal bisector of the optical waveguide plate 100 may be determined by first determining a tangent of the upper edge of the optical waveguide plate 100 in the horizontal direction and a tangent of the lower edge of the optical waveguide plate 100 in the horizontal direction and then locating a horizontal line that is equidistant from the two tangents.

Illustratively, as shown in FIG. 15(*b*), when the optical waveguide plate 100 is circular, the center of a circle can be located, and then a horizontal diameter line is used as the horizontal bisector of the optical waveguide plate 100.

Illustratively, as shown in FIG. 15(*c*), when the optical waveguide plate 100 is in the form of a rounded rectangle, the horizontal bisector of the optical waveguide plate 100 may be located by determining the midpoint of the upper edge and the midpoint of the lower edge and then locating a horizontal line that is equidistant from the midpoint of the upper edge and the midpoint of the lower edge.

Figure 16:
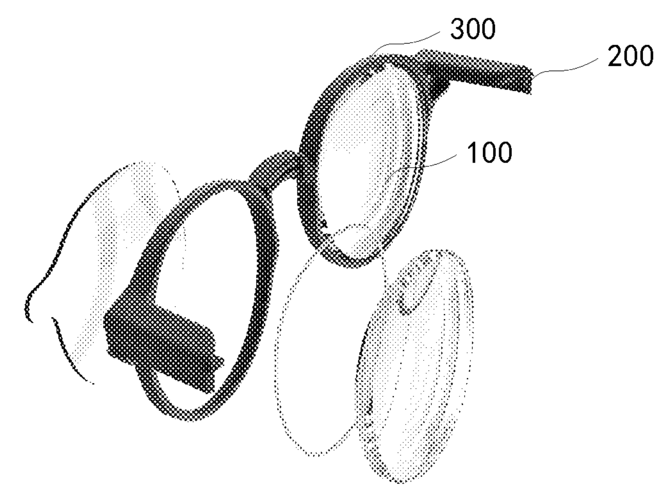
FIG. 16 is a schematic structural diagram of a frame according to an embodiment of the present application.

Referring to FIG. 16, FIG. 16 is a schematic structural diagram of a frame according to an embodiment of the present application.

As shown in FIG. 16, the frame 1000 includes a optical engine assembly 200, a rim 300, and the optical waveguide plate 100.

The optical engine assembly 200 is configured to emit display light, and the display light is received by the coupling-in region 20 of the optical waveguide plate 100. The optical waveguide plate 100 may be fixedly mounted within the rim 300.

Specifically, the optical waveguide plate 100 may be configured with reference to the examples of FIGS. 1 to 15. For example, the optical waveguide plate 100 includes the waveguide substrate 10, the coupling-in region 20, and the coupling-out region 30 as described in the embodiments described above, and the specific configuration of the optical waveguide plate 100 may refer to the corresponding embodiments described in the specification of the present application, which will not be repeated herein.

In the frame 1000 of the present application, the coupling-out region 30 can be moved out of a central region of a primary field of view of smart glasses by changing the position of the coupling-out region 30 in the optical waveguide plate 100, which effectively avoids the occurrence of diffractive rainbow stripes in the primary field-of-view region of the wearer, and can also ensure the implementation of AR imaging in an effective area, enabling clear and accurate viewing of the information displayed in the coupling-out region 30 by the wearer even with a slight upward glance.

Figure 17:
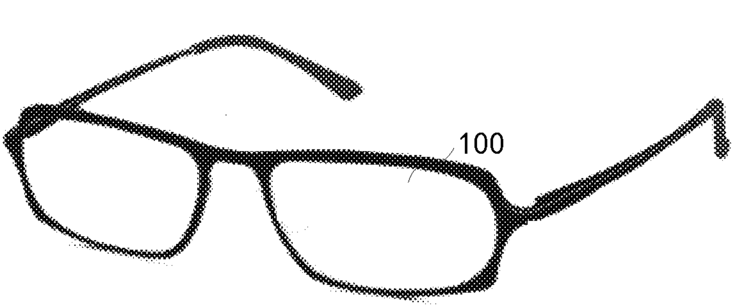
FIG. 17 is a schematic structural diagram of smart glasses according to an embodiment of the present application.

Referring to FIG. 17, FIG. 17 is a schematic structural diagram of smart glasses according to an embodiment of the present application.

As shown in FIG. 17, smart glasses 2000 include optical waveguide plates 100.

Specifically, the optical waveguide plate 100 may be configured with reference to the examples of FIGS. 1 to 12. For example, the optical waveguide plate 100 includes the waveguide substrate 10, the coupling-in region 20, and the coupling-out region 30 as described in the embodiments described above, and the specific configuration of the optical waveguide plate 100 may refer to the corresponding embodiments described in the specification of the present application, which will not be repeated herein.

In the smart glasses 2000 of the present application, the coupling-out region 30 can be moved out of a central region of a primary field of view of smart glasses by changing the position of the coupling-out region 30 in the optical waveguide plate 100, which effectively avoids the occurrence of diffractive rainbow stripes in the primary field-of-view region of the wearer, and can also ensure the implementation of AR imaging in an effective area, enabling clear and accurate viewing of the information displayed in the coupling-out region 30 by the wearer even with a slight upward glance.

The foregoing descriptions are merely specific implementations of the present application, but are not intended to limit the protection scope of the present application. Any equivalent modification or replacement readily figured out by a person skilled in the art within the technical scope disclosed in the present application shall fall within the protection scope of the present application. Therefore, the scope of protection of the present application shall be subject to the scope of protection of the claims.

What is claimed is:

1. A pair of smart glasses, comprising:

an optical waveguide plate comprising:

a waveguide substrate;

a coupling-in region and a coupling-out region disposed on the waveguide substrate, the coupling-in region being configured to couple light into the waveguide substrate, and the coupling-out region being configured to couple out the light propagating within the waveguide substrate; and a grating layer disposed on the waveguide substrate to form only the coupling-in region and the coupling-out region;

wherein a bottom edge of the coupling-out region is located above a horizontal bisector of the optical waveguide plate; or the bottom edge of the coupling-out region is entirely or partially flush with the horizontal bisector of the optical waveguide plate.

2. The smart glasses according to claim 1, wherein a distance between the bottom edge of the coupling-out region and the horizontal bisector of the optical waveguide plate is greater than or equal to 2 mm.

3. The smart glasses according to claim 1, wherein the coupling-out region is in the form of a rectangle or a rounded rectangle.

4. The smart glasses according to claim 1, wherein a length of the coupling-out region is greater than or equal to twice a width of the coupling-out region, the length being an extension of the coupling-out region in a horizontal direction, and the width being an extension of the coupling-out region in a vertical direction.

5. The smart glasses according to claim 4, wherein the length of the coupling-out region is greater than or equal to 3 times the width of the coupling-out region.

6. The smart glasses according to claim 1, wherein apart from the coupling-in region and the coupling-out region, there are no other grating regions on the waveguide substrate.

7. The smart glasses according to claim 1, wherein the grating layer has a thickness ranging from 10 nanometers to 500 nanometers.

8. The smart glasses according to claim 1, further comprising:
a first anti-reflection coating disposed on a surface of the grating layer.

9. The smart glasses according to claim 8, wherein the first anti-reflection coating is disposed around the coupling-in region and the coupling-out region, and the first anti-reflection coating does not cover the coupling-in region and the coupling-out region.

10. The smart glasses according to claim 8, wherein the first anti-reflection coating covers the coupling-in region and the coupling-out region.

11. The smart glasses according to claim 8, further comprising:
a second anti-reflection coating disposed on a second surface of the waveguide substrate.

12. The smart glasses according to claim 11, further comprising:
a first protective lens disposed on a side away from the wearer and stacked on the grating layer; and
a second protective lens disposed on a side close to the wearer and stacked on the second surface of the waveguide substrate.

13. The smart glasses according to claim 12, further comprising:
a third anti-reflection coating disposed on a first surface of the first protective lens; and/or
a fourth anti-reflection coating disposed on a second surface of the first protective lens; and/or
a fifth anti-reflection coating disposed on a first surface of the second protective lens; and/or
a sixth anti-reflection coating disposed on a second surface of the second protective lens.

14. The smart glasses according to claim 13, wherein the waveguide substrate, the grating layer, the first protective lens and the second protective lens each comprise a material with a refractive index less than or equal to 2.

15. The smart glasses according to claim 12, wherein the waveguide substrate, the grating layer, the first protective lens and the second protective lens each comprise a material with a refractive index less than or equal to 2.

16. The smart glasses according to claim 1, wherein the shape of the optical waveguide plate comprises a circle, an ellipse, a rounded rectangle, or an irregular pattern.

17. The smart glasses according to claim 1, wherein the horizontal bisector of the optical waveguide plate comprises one of a horizontal line corresponding to a center point of the optical waveguide plate, and a bisector in a horizontal direction.

18. The smart glasses according to claim 1, wherein the central position of the coupling-out region and the projection position of the pupil center of the human eye on the optical waveguide plate form a preset included angle θ relative to the projection of the pupil center of the wearer's eye on a plane in which the cross-section of the optical waveguide plate is located, the preset included angle θ being less than or equal to 30°.

* * * * *